US009582544B2

(12) United States Patent
Brew et al.

(10) Patent No.: US 9,582,544 B2
(45) Date of Patent: *Feb. 28, 2017

(54) TEMPORAL PROXIMITY QUERY EXPANSION

(71) Applicant: International Business Machines Corporation, Armonk, NY (US)

(72) Inventors: Anthony T. Brew, Dublin (IE); Jonathan I. Settle, London (GB); Kristian J. Stewart, Thames Ditton (GB); Zhenni Yan, London (GB)

(73) Assignee: International Business Machines Corporation, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/480,021

(22) Filed: Sep. 8, 2014

(65) Prior Publication Data
US 2015/0310105 A1 Oct. 29, 2015

Related U.S. Application Data

(63) Continuation of application No. 14/260,486, filed on Apr. 24, 2014.

(51) Int. Cl.
*G06F 17/30* (2006.01)
(52) U.S. Cl.
CPC .. *G06F 17/30528* (2013.01); *G06F 17/30392* (2013.01); *G06F 17/30551* (2013.01); *G06F 17/30864* (2013.01); *G06F 17/30672* (2013.01)

(58) Field of Classification Search
None
See application file for complete search history.

(56) References Cited

U.S. PATENT DOCUMENTS

| | | | |
|---|---|---|---|
| 7,287,025 B2 | 10/2007 | Wen et al. | |
| 7,805,455 B2 | 9/2010 | Todhunter | |
| 8,156,111 B2 | 4/2012 | Jones et al. | |
| 8,280,900 B2 | 10/2012 | Pickens et al. | |
| 8,306,967 B2 | 11/2012 | Galitsky et al. | |
| 8,452,798 B2 | 5/2013 | Myaeng et al. | |
| 8,463,806 B2 | 6/2013 | Loritz et al. | |
| 2005/0203878 A1* | 9/2005 | Brill | G06F 17/3064 |
| 2007/0203929 A1* | 8/2007 | Bolivar | G06F 17/30672 |
| 2012/0130978 A1* | 5/2012 | Li | G06F 17/3064 707/706 |
| 2013/0024443 A1 | 1/2013 | Achuthan et al. | |

OTHER PUBLICATIONS

IBM, "Root Cause Analysis Support Tool by using Text Analytics", IP.com Prior Art Database Technical Disclosure, IPCOM000189572D, Nov. 13, 2009.

(Continued)

*Primary Examiner* — Hung Q Pham
(74) *Attorney, Agent, or Firm* — Isaac J. Gooshaw

(57) ABSTRACT

Search query expansion tool is provided. A processor generates a collection of events for a search result, wherein events included in the collection of events are within a temporal proximity to the search result. A processor determines a content of the collection of events. A processor determines a search suggestion based, at least in part, on the content of the collection of events.

7 Claims, 5 Drawing Sheets

(56) References Cited

OTHER PUBLICATIONS

Pu et al., "Web Relevant Term Suggestion Using Log-based and Text-based Approaches", Dec. 2006, pp. 1-22, <http://lac3.glis.ntnu.edu.tw/vj-attachment/2009/04/attach14_1.pdf>.
Ruocco et al., "Exploring Temporal Proximity and Spatial Distribution of Terms in Web-based Search of Event-Related Images", 24th ACM Conference on Hypertext and Social Media, May 1-3, 2013, Paris, France, pp. 248-252, Copyright 2013 ACM.
Zheng et al., "Method and System for Temporal Query Log Profiling for Web Search Ranking", IP.com Prior Art Database Technical Disclosure, IPCOM000198741D, Aug. 13, 2010, pp. 1-6.
"Information gain ratio", Wikipedia, the free encyclopedia, page last modified Oct. 12, 2013, <https://en.wikipedia.org/wiki/Information_gain_ratio>.
"Log Search" Searching Log Data for Network Security Intelligence, provided on search report dated Nov. 23, 2013.
"Search expansion", eBay, provided in Main Idea of Disclosure dated Nov. 23, 2013, <http://pages.ebay.com/help/search/expanding.html>.
U.S. Appl. No. 14/260,486, entitled "Temporal Proximity Query Expansion", filed Apr. 24, 2014.
Appendix P List of IBM Patents or Patent Applications Treated As Related.
Herbeck, Ryan, "Automatic Query Expansion in Information Retrieval", provided in Search Report dated Nov. 22, 2013, <http://www.google.com/url?sa=t&rct=j&q=%esrc=s&source=web&cd=4&cad=rja&ved=0CEgQFjAD&url=http%3A%2F%2Fwww.uwplatt.edu%2Fcsse%2Fcourses%2Fprev%2Fcsse411-materials%2Ff12%2FHerbeck_AQE_In_IR_Seminar_Journal.doc&ei=R_6KUtn0O4eOrQe7z4GQAw&usg=AFQjCNHENg_GRusahIPM2im2geNolO2Acw&bvm=bv.56643336,d.bmk>.

\* cited by examiner

TEMPORAL PROXIMITY QUERY EXPANSION

BACKGROUND OF THE INVENTION

The present invention relates generally to the field of search engines, and more particularly to search query expansion.

Search engines provide users with the ability to search through large databases for particular information stored in documents. Users submit search queries to the search engine, typically expressed as a group of words. The search engine generates results, or hits, based on the received search query matching information stored in a database. Search engines typically present the results to users as a list with links to the documents matched to the list of results. Search engines will sometimes provide suggestions to expand a search to include more results, a technique referred to as query expansion.

SUMMARY

According to embodiments of the present invention, a system, method and program product provide search query expansion. A processor generates a collection of events for a search result, wherein events included in the collection of events are within a temporal proximity to the search result. A processor determines a content of the collection of events. A processor determines a search suggestion based, at least in part, on the content of the collection of events.

DETAILED DESCRIPTION

Figure 1:
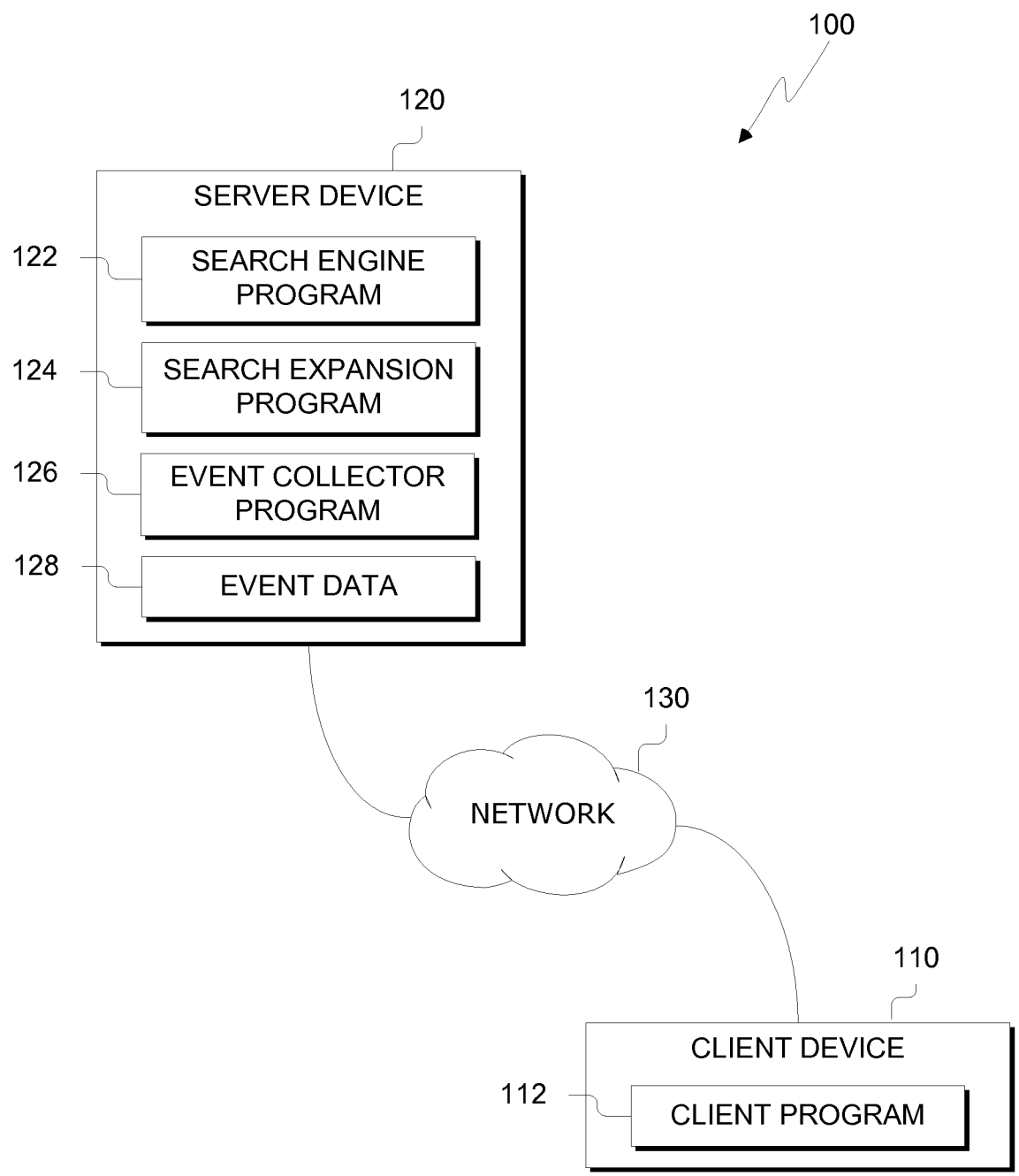
FIG. 1 is a functional block diagram illustrating a networked environment, in accordance with an embodiment of the present invention.

In some cases, a user may not know of relevant queries that will expand a search to include results not originally provided. By expanding the search, the user is presented with more relevant information than the original query provided. While search query expansion techniques are known, they rely solely on suggesting terms that are similar in content to the original query received from a user. Embodiments of the invention disclose content determination to suggest for query expansion. The content to be suggested is based on other documents in a database which have a time associated with the documents. Documents that fall within a certain time frame surrounding the original results generated by the search engine will be analyzed for content. The content of the documents surrounding the original results is suggested to the user to help find events or other information related to the original search query. By suggesting query expansion terms based on content within a temporal proximity, a user is provided suggestions to help find trends or causes related to the original query. This allows a user to further expand the search to include such determined trends or causes. Providing suggestions based on temporal proximity to original search results allows users in various types of fields to broaden their search to include trends or causes that they did not include in the original submitted search query. Examples of fields where the present invention may be practiced are search engines used for root cause analysis (such as accident analysis, failure analysis, or systems analysis), forensics analysis, market analysis, social networking analysis, or any field where search results include a time of occurrence associated with an event included in a data log.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked environment, generally designated 100, in accordance with one embodiment of the present invention. The network environment 100 includes client device 110 and server device 120 connected over network 130. Client includes client program 112. Server device 120 includes search engine program 122, search expansion program 124, event collector program 126 and event data 128.

In various embodiments of the present invention, client device 110 and server device 120, respectively, are computing devices that can each be a standalone device, a server, a laptop computer, a tablet computer, a netbook computer, a personal computer (PC), or a desktop computer. In another embodiment, client device 110 and server device 120 each represent computing systems utilizing clustered computers and components to act as a single pool of seamless resources. In general, server device 120 can be any computing device or a combination of devices with access to client program 112, search engine 122, search expansion program 124 and event collector program 126 and is capable of executing client program 112, search engine program 122, search expansion program 124 and event collector program 126. Client device 112 and server device 120 may respectively include internal and external hardware components, as depicted and described in further detail with respect to FIG. 5.

In this exemplary embodiment, client program 112 is stored on client device 110. However, in other embodiments, client program 112 may be stored externally and accessed through a communication network, such as network 130. In this exemplary embodiment, search engine program 122, search expansion program 124, event collector program 126 and event data 128 are stored on server device 120. However, in other embodiments, search engine program 122, search expansion program 124, event collector program 126 and event data 128 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between client device 110 and server device 120, in accordance with a desired embodiment of the present invention.

In exemplary embodiments, client program 112 of client device 110 sends a search query to search engine program 122 of server device 120. The search query includes text, indicative of keywords or topics, received by client program 112 from client device 110 for which a user has requested to perform a search on. In some embodiments, the received search query may include instructions to limit or broaden the search query such as wild cards, phrases, search operators (e.g., Boolean operators or proximity operators) or filters based on metadata stored in event data 128 (e.g., date or time a document was stored in event data 128; date or time an event occurred that is represented by a document in event data 128; or an author or source that a document was created by or originated from). In other embodiments, client program 112 sends the search query in a predetermined syntax, such as Structured Query Language (SQL) statements, to modify the search query.

In response to receiving a search query from client program 112, search engine program 122 generates a set of initial search results. Search engine program 122 compares the text of the received search query to event data 128. In response to the received search query matching an entry in event data 128, search engine program 122 adds the matched entry to the set of initial search results. Search engine program 122 may also apply instructions or syntax to the received search query. For example, if the search query contains a wildcard instruction for a specific keyword, then search engine program 122 broadens the search query with additional terms represented by the wildcard instruction. Wildcard instructions expand the text of the search query to include more keywords than originally given in the search query. An example of a wildcard instruction would be an asterisk or "*" which will match zero or more additional characters in a string, such a "test*" would include "test", "tests", and "testing" in the search query. Search engine program 122 sends the initial search results to search expansion program 124.

Event data 128 stores documents representing events such as, but not limited to, actions, data logs, requests, results, incidents, failures or errors. A document stores information describing a single instance of an event and may include descriptive text of the event and the time and/or date the event occurred. A document may include information describing the event such as, but not limited to, a request to perform an action, participants or resources that are part of the request, and results of the event. A document may also include a time and/or date an event was requested or the time and/or date that a result of the event has occurred.

Event collector program 126 adds documents to event data 128. Event collector program 126 receives documents and stores the documents in event data 128. In some embodiments, event collector program 126 analyzes external data sources to create documents to store in event data 128. External data sources may include, but are not limited to, web sites, databases or event logs. Event collector program 126 analyzes the content of the external data sources and determines the content of the external data sources, such as any events that have occurred within the content of the data sources and any times or dates associated with the determined events of the data sources. Based on the analysis of the external data sources, event collector program 126 creates and stores documents in event data 128. In other embodiments, event collector program 126 receives documents from external data sources for storage in event data 128. In other embodiments, event collector program 126 receives documents from devices connected to network 130. Devices connected to network 130 may send documents to event collector program 126 to store in event data 128. In other embodiments, event collector program 126 monitors devices connected to network 130 and determines relevant events to be stored in event data 128. As an example, event collector program 126 may analyze error logs of servers on a network. Event collector program 126 creates event data 128 for an error in the error logs of the servers. Event collector program 127 stores information describing the error, e.g. error message, requestor, and/or resources used in the request, as well as a time and/or date that the error occurred.

In exemplary embodiments, search expansion program 124 receives a set of initial search results from search engine program 122. Search expansion program 124 generates a list of search suggestions based on the received set of initial search results. For a given member of the set of initial search results, search expansion program 124 retrieves the corresponding event data 128. For example, search engine program 122 generates a hit for an event in event data 128. Search expansion program 124 retrieves the time that the event occurred to use as a basis for search expansion. If a date and/or time for the member are stored in event data 128, then search expansion program 124 generates a collection of events stored in event data 128 that occur within a temporal proximity to the given search result's date and/or time. For example, search expansion program 124 identifies other events in event data 128 that occur within a temporal proximity or time frame surrounding the time an event has occurred. For an event in event data 128 that is within the time frame, search expansion program 124 includes the event in the collection. Search expansion program 124 generates a collection of each of the events returned by search engine program 122 as search results.

A time frame is an adjustable window of time surrounding events returned by search engine program 122. In some embodiments, the time frame may be small (e.g., as small as a seconds or hours) when determining causes in an environment where events occur very rapidly, like in error logs in a large networked environment. In other embodiments, the time frame may be very large (e.g., as large as days, weeks, months, or years) when determining causes where effects take longer to propagate such as in accident analysis. Search expansion program 124 includes events in event data 126 that occur within the time frame. In some embodiments, events that are considered to be within a temporal proximity include events that occur within a time frame that includes periods of time that exist before and after the time and/or date the event representing the particular member of the set of initial search results occurred. In other embodiments, the time frame includes events that occurred before the time and/or date the event representing the particular member of the set of initial search results occurred. In other embodiments, the time frame includes events that occurred after the time and/or date the event representing the particular member of the set of initial search results occurred.

In some embodiments, the time frame that determines temporal proximity to a given search result is dynamic. For example, based on the number of events contained in the collections, which were determined to be in temporal proximity to the one or more initial search results, search expansion program 124 may lengthen or shorten the time frame. If the number of events contained in a collection related to a member of the initial search results is determined to be below a certain threshold, then search expansion program 124 will increase the time frame such that additional events are included in the collection of events. In other embodiments, the time frame is static in relation to a set of initial search results. A user of client device 110 may change the time frame manually, by way of client program 112, as an instruction when entering a search query. For example, the instruction may be an option in a graphical user interface provided by search engine program 122 or as a syntactical command included in the search query. The time frame may also be set manually by an administrator of server 130 as a setting of search expansion program 124.

In exemplary embodiments, search expansion program 124 determines the content of a collection of events by applying natural language processing to the documents represented by that collection of events. Search expansion program 124 creates a temporal content document containing the content determined to be representative of a particular collection of events that are in temporal proximity to a respective search result. As such, search expansion program 124 creates a plurality of temporal content documents for the one or more initial search results, respectively representing content of events that occur in temporal proximity to the one or more initial search results. In some embodiments, one or more of the temporal content documents may include events that are not in temporal proximity.

In exemplary embodiments, search expansion program 124 compares the one or more temporal content documents to the set of initial search results. Based on the comparison, search expansion program 124 determines a list of terms representing content found in both the one or more temporal content documents and the documents represented by the set of initial search results. In some embodiments, search expansion program 124 bases the comparison between the one or more temporal content documents and the set of initial search results on frequently occurring content of the temporal content documents. In other embodiments search expansion program 124 bases the comparison on uniquely occurring features of content of the temporal content documents when compared to event data 128 not in temporal proximity of the initial search results. In other embodiments, search expansion program 124 bases the comparison on frequent subsets of content co-occurring within the temporal content documents when compared to the initial search results. In further embodiments, search expansion program 124 bases the comparison on frequently occurring content, uniquely occurring features of content and frequent subsets of content. The comparison of temporal content and the determination of a list of suggested terms are described in further detail in the descriptions of FIGS. 2, 3, and 4 below.

Search expansion program 124 generates a list of one or more suggestions based, at least in part, on the determined list of terms. Search expansion program 124 sends the list of one or more suggestions to search engine program 122. Search engine program 122 sends the initial search results based on the received search query as well as the list of one or more suggestions to client program 112. Client program 112 displays the initial search results on client device 110. Client program 112 also displays the list of one or more suggestions on client device 110, such that a user of client device 110 is presented with terms to expand the search query.

As an example of the above embodiments, a user creates a search query on client device 110 and input the search query into client program 112. Client program 112 will send the query to search engine program 122. Search engine program 122 will perform a search based on the search query and generate a set of initial search results, generating results from data in event data 128. Search engine program 122 sends the initial search results to search expansion program 124. Search expansion program 124 generates a collection of events for each result of the initial search results. The respective collection of events for a particular search result will include events that occur within a time frame, or temporal proximity, to the time represented in event data 128 for the search result. Search expansion program 124 repeats this process for the set of initial search results generating one or more collections of events. Search expansion program 124 determines content of the one or more collections of events and compares the content to the initial search results to determine frequent, unique, or supportive content between the initial search results and the collections of events in temporal proximity to the initial search results. Search expansion program 124 will organize the content based on the determination of frequent, unique, or supportive content and send the organized content to search engine program 122 as suggested content for query expansion. Search engine program 122 will send the initial search results, as well as the suggested content for query expansion, to client program 112. Client program 112 will display the initial search results and the suggested content for query expansion on client device 110, providing the user with the originally requested search query results as well as relevant content to expand the search to find additional results that occurring in a similar time frame as the original search results.

Figure 2:
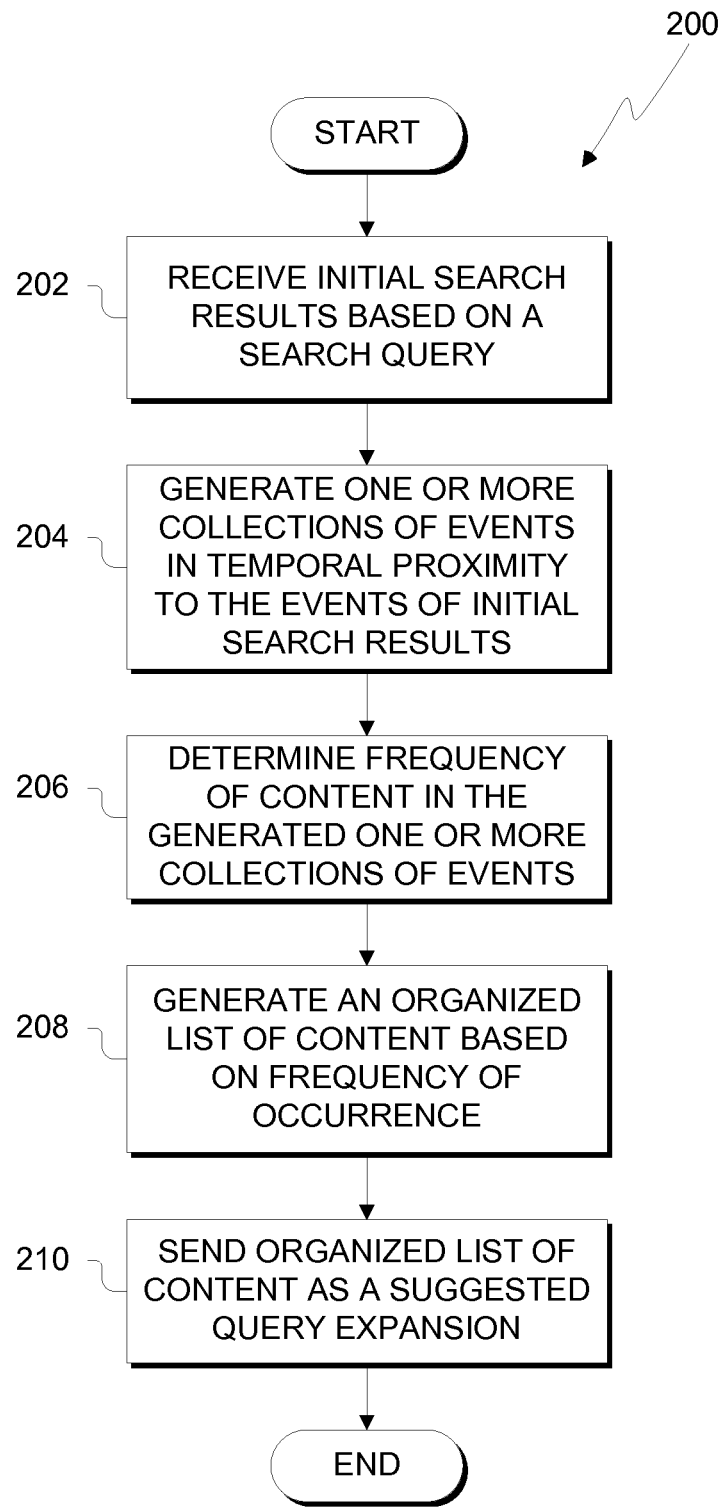
FIG. 2 illustrates operational processes of a first aspect of search expansion program executing on a computing device within the environment of FIG. 1, in accordance with an embodiment of the present invention.

FIG. 2, is a flowchart, 200, illustrating the operational process of a first aspect of search expansion program 124 executing on 120, in accordance with an embodiment.

In process 202, search expansion program 124 receives one or more initial search results from search engine program 122. In process 204, search expansion program 124 generates a plurality of collections of events within temporal proximity of the one or more initial search results. For a given search result, search expansion program 124 retrieves the time the given search result occurred as stored in event data 128. Search expansion program 124 generates a collection of events that occur within a time frame of the given search result occurring. Search expansion program 124 repeats process 204 for the entire set of initial search results, generating a respective collection of events in temporal proximity for a given search result.

In process 206, search expansion program 124 identifies the content for the one or more collections of events and the frequency the content occurs among the collections of events. In process 208, search expansion program 124 generates an organized list of content. Search expansion program 124 organizes content based on the number of occurrences a particular piece of content within the one or more collections of events. For example, if documents stored in event data 128 contain content similar to other event data 128, and both documents are determined to be in temporal proximity to an initial search result, then search expansion program 124 will count the number of times the particular content is found in both documents.

Search expansion program 124 repeats the process of comparing the documents generated in the collections of events and counts any entries where particular content is found in content among the collections of events determined to be in temporal proximity of the initial search results. As such, search expansion program 124 generates a list of similar content found to be among the collections of events determined to be in temporal proximity of the initial search results as well as a frequency that a particular piece of content was found to be similar among the collections of events. Search expansion program 124 organizes the list of similar content based on frequency of occurrence, thereby generating a list of frequent content of the collections of events determined to be within temporal proximity of the initial search results.

In process 210, search expansion program 124 sends the organized list of content to search engine program 122 as a suggested query expansion. Search engine program 122 sends the initial search results as well as the suggested query expansion to client program 112. Client program 112 displays the initial search results, as generated by search engine program 122, as well as the suggested query expansion, as generated by search expansion program 124, on client device 110.

Figure 3:
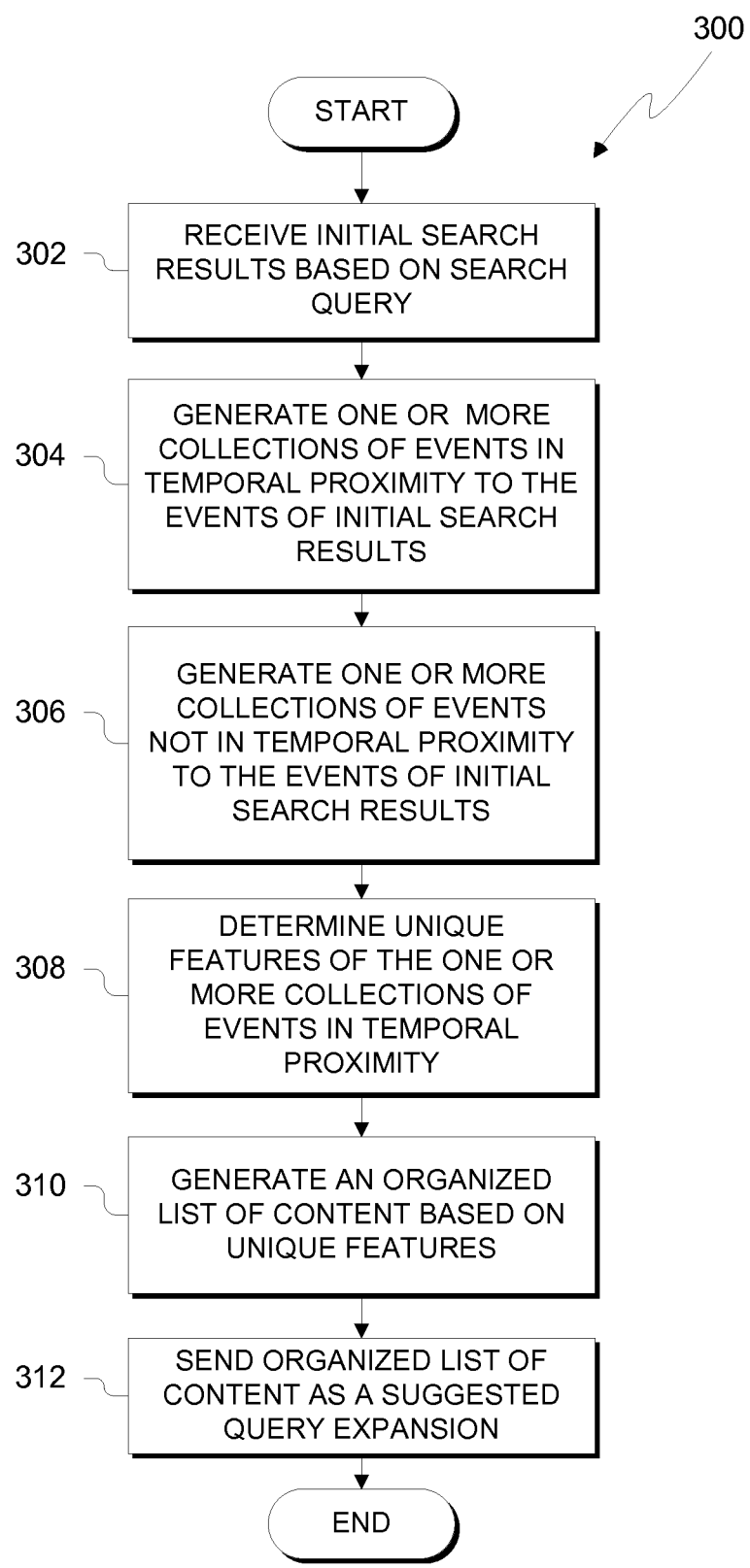
FIG. 3 illustrates operational processes of a second aspect of search expansion program executing on a computing device within the environment of FIG. 1, in accordance with an embodiment of the present invention.

FIG. 3, is a flowchart, 300, illustrating the operational process of a second aspect of search expansion program 124 executing on 120, in accordance with an embodiment.

In process 302, search expansion program 124 receives one or more initial search results from search engine program 122. In process 304, search expansion program 124 generates a plurality of collections of events within temporal proximity of the one or more initial search results. For a given search result, search expansion program 124 retrieves the time the given search result occurred as stored in event data 128. Search expansion program 124 generates a collection of events that occur within a time frame of the given search result occurring. Search expansion program 124 repeats process 304 for the entire set of initial search results, generating a respective collection of events in temporal proximity for a given search result.

In process 306, search expansion program 124 generates one or more collections of events not in temporal proximity to the initial search results. Search expansion program 124 determines the occurrences in time that event data 128 corresponding to the initial search results occurs. Search expansion program 124 generates collections of events that do not occur within the time frame used in process 304. Search expansion program 124 samples event data 128 for documents that do not occur within the time frame used in process 304 to generate collections of events not in temporal proximity to the initial search results.

Search expansion program 124 selects collections of events that do not occur in temporal proximity to the initial search results. For a given collection, search expansion program 124 selects random sequences of events in event data 128 that do not overlap with the collections of events generated in process 304 and do not occur within temporal proximity to the initial search results. In some embodiments, search expansion program 124 includes all event data 128 that does not overlap with the collections of events generated in process 304 and does not occur within temporal proximity to the initial search results. In other embodiments, search expansion program 124 limits the amount of collections of events not in temporal proximity to the initial search results. For example, search expansion program may randomly select a number of collections of events not in temporal proximity to the initial search results in a similar amount to the collections of events in temporal proximity to the initial search results, as determined in process 304.

In process 308, search expansion program 124 determines one or more features to the collections of events in temporal proximity to the initial search results (generated in process 304) that are unique when compared to the collections of events not in temporal proximity to the initial search results (generated in process 306). Search expansion program 124 applies an algorithm for feature selection to determine features unique to the collections of events in temporal proximity to the initial search results when compared to the sample of collections of events not in temporal proximity to the initial search results. For example, search expansion program 124 may determine the information gain for a particular collection of events in temporal proximity to a particular search result against the collections of events not in temporal proximity to the initial search results. Information gain is the change in entropy by taking a particular feature into consideration. For content in the particular collection of events in temporal proximity to a particular search result determined to have information gain above a predetermined value, search expansion program 124 will store the content and assign an information gain ratio to the content. Information gain ratio of a feature is the ratio between information gain of the feature and the intrinsic value of the feature for all features of the collections of events. The intrinsic value of a feature is determined to be the average entropy of the feature for all instances the feature within the one or more collections of events. Search expansion program 124 repeats the determination of information gain for a given collection of events that occurred in temporal proximity to the initial search results, determining unique features and associating an information gain ratios representative of the uniqueness when compared to the collections of events not in temporal proximity to the initial search results.

As an example of implementing a feature selection algorithm, search expansion program 124 creates two sets. The first set being the features of the initial search results and the collections of events that occur within temporal proximity to the initial search results. The second set being the features of the collections of events that do not occur within temporal proximity to the initial search results. Search expansion program 124 determines the information gain of the features for the first set. If the information gain for a feature is above a predetermined value, then search expansion program 124 will select the feature as a possible candidate for search query expansion. Search expansion program 124 determines the information gain of the features comprising the second set. If a candidate of the first set is not present in the second set, then search expansion program 124 suggests the respective candidate of the first set for search query expansion. If a candidate of the first set is also present as a feature of the second set, then search expansion program 124 compares the information gain of the respective feature of the second set to a predetermined value. If the information gain of the respective feature in the second set is below the predetermined value, search expansion program 124 suggests the respective candidate of the first set for search query expansion. If the information gain of the respective feature in the second set is above the predetermined value, search expansion program 124 will disregard the candidate as a suggestion for search query expansion. Search expansion program 124 determines an information gain ratio for each of the candidates in the first set to organize the features suggested for search expansion by search expansion program 124.

As another example of implementing a feature selection algorithm, search expansion program 124 creates three sets. The first set being the features of the initial search results and act as a training set. The second set being the features of the collections of events that occur within temporal proximity to the initial search results. The third set being the features of the collections of events that do not occur within temporal proximity to the initial search results. The information gain of features from the second and third sets are determined when added to the first, or training, set. Search expansion program 124 compares the information gains for the features of the second set to those determined for the third set. For features of the second set that have a higher information gain when compared to the information gain of features of the third set, the feature is determined to be unique and relevant to the first set. As such the feature of the second set with higher information gain when added to the first set than those of the third set are offered as suggestions for search expansion by search expansion program 124.

Search expansion program 124 will determine an information gain ratio for each of the features in the second set determined to be unique.

In process 310, search expansion program 124 generates an organized list of content based on the unique features determined in process 308. Search expansion program 124 generates a list of features and organizes the features based on the information gain ratios determined in the feature selection algorithm, as determined in process 308. In some embodiments, search expansion program 124 determines a feature is unique based on the determined information gains of the features. In such embodiments, search expansion program 124 organizes the list of content on the unique features based on the determined information gain, as determined in process 308. In process 312, search expansion program 124 sends the organized list of content to search engine program 122 as a suggested query expansion. Search engine program 122 sends the initial search results as well as the suggested query expansion to client program 112. Client program 112 displays the initial search results, as generated by search engine program 122, as well as the suggested query expansion, as generated by search expansion program 124, on client device 110.

Figure 4:
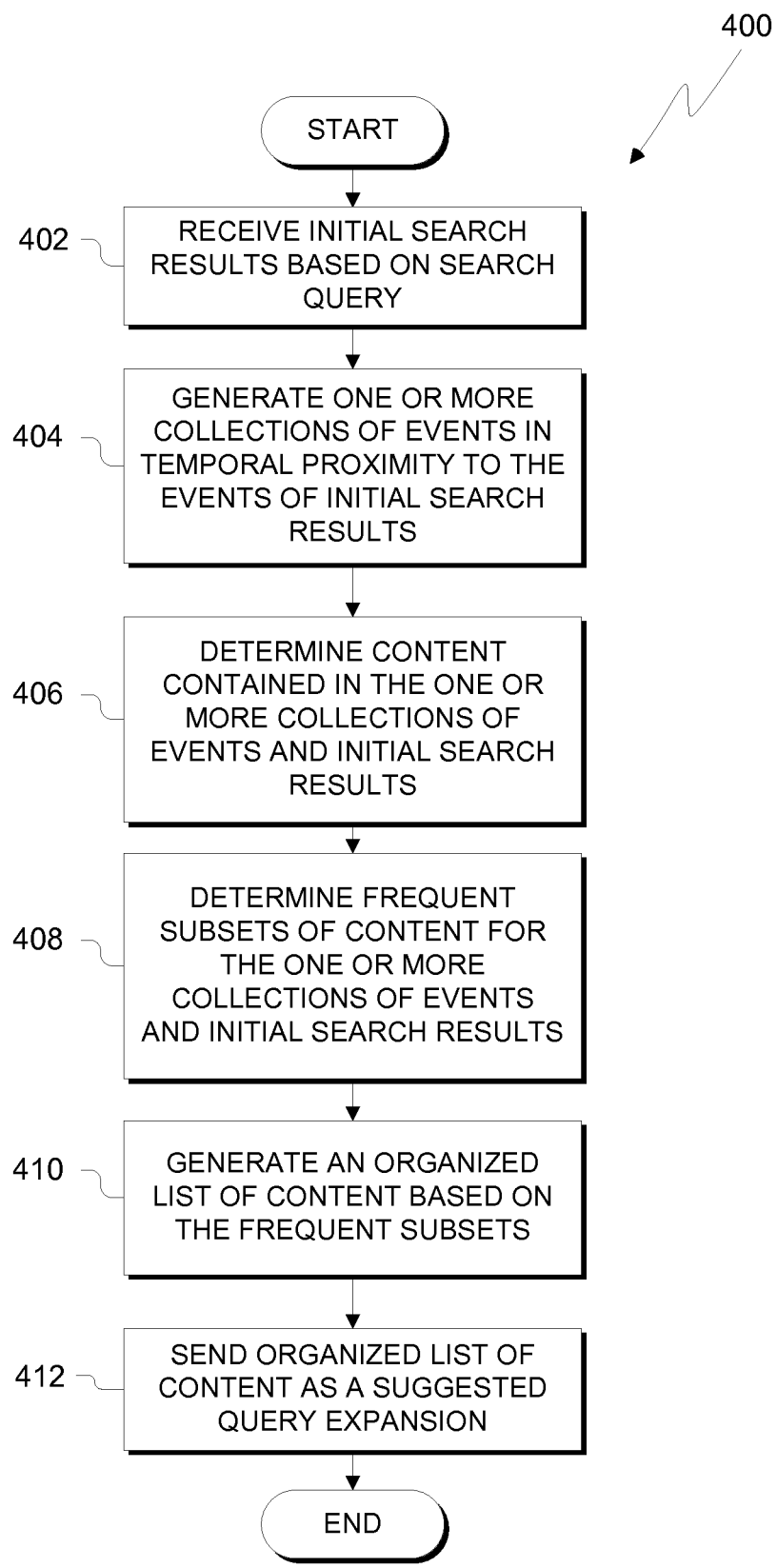
FIG. 4 illustrates operational processes of a third aspect of search expansion program executing on a computing device within the environment of FIG. 1, in accordance with an embodiment of the present invention.

FIG. 4, is a flowchart, 400, illustrating the operational process of a third aspect of search expansion program 124 executing on 120, in accordance with an embodiment.

In process 402, search expansion program 124 receives a set of initial search results from search engine program 122. In process 404, search expansion program 124 generates a plurality of collections of events within temporal proximity of the one or more initial search results. For a given search result, search expansion program 124 retrieves the time the given search result occurred as stored in event data 128. Search expansion program 124 generates a collection of events that occur within a time frame of the given search result occurring. Search expansion program 124 repeats process 404 for the entire set of initial search results, generating a respective collection of events in temporal proximity for a given search result.

In process 406, search expansion program 124 determines content contained in the collections of events and the initial search results. For example, search expansion program 124 applies natural language processing to the one or more collections of events for the documents stored in event data 128 corresponding to the events contained in the one or more collections of events. Search expansion program 124 creates a set of all content determined to be contained in the collections of events and the initial search results. For the collections of events and the initial search results, search expansion program 124 stores the presence or absence of each member of the set of all content determined to be contained in the collections of events and the initial search results.

In process 408, search expansion program 124 determines subsets of features and the initial search results that frequently co-occur. Search expansion program 124 applies an apriori algorithm to the collections of events and the initial search results to determine frequent subsets of content determined to co-occur in the collections of events and the initial search results. For a given frequent subset, search expansion program 124 determines a number of co-occurrences frequent subset has in the set of all content determined to be contained in the collections of events and the initial search results and generates content as suggestions for search query expansion based on the determination.

As an example of implementing an apriori algorithm, search expansion program 124 determines a global feature set comprising features represented by the content of the one or more collections of events and the one or more initial search results. Search expansion program 124 determines the total number of occurrences of a feature of the global feature set across the one or more collections of events and the initial search results. Search expansion program 124 determines the feature with the smallest number of total occurrences. Search expansion program 124 generates a support threshold based on the smallest number of total occurrences. Search expansion program 124 generates one or more item sets for each event in the one or more collections of events and for each search result in the initial search results. Search expansion program 124 determines the presence of a feature represented by the global feature set for the event of the one or more collection of events or the search result of the initial search results. Search expansion program 124 updates the respective item set to represent the determined presence of the feature. Search expansion program 124 generates one or more subsets of features represented by the global feature set. Search expansion program 124 begins with subsets containing each combination of at least two features in the global feature set. Search expansion program 124 determines the number of co-occurrences that all features of a given subset occur across all item sets. Based on the subset having a number of co-occurrences larger or equal to the support threshold, search expansion program 124 determines the subset of features not frequently occur and will generate the subset of features as a search suggestion. Search expansion program 124 may continue to generate larger subsets including more features of the global feature set. If search expansion program 124 determines a larger subset of features is greater to or equal to the support threshold, then search expansion program 124 will generate the subset of features as a search suggestion. If search expansion program 124 is unable to determine any more subsets of features that are greater to or equal to the support threshold, then search expansion program 124 finish generating search suggestions.

In process 410, search expansion program 124 organizes the frequent subsets based on the number of co-occurrences determined in process 408. Search expansion program 124 generates an organized list of content based on the content of the frequent subsets and the number of co-occurrences determined for the frequent subsets in process 408. In process 412, search expansion program 124 sends the organized list of content to search engine program 122 as a suggested query expansion. Search engine program 122 sends the initial search results as well as the suggested query expansion to client program 112. Client program 112 displays the initial search results, as generated by search engine program 122, as well as the suggested query expansion, as generated by search expansion program 124, on client device 110.

Figure 5:
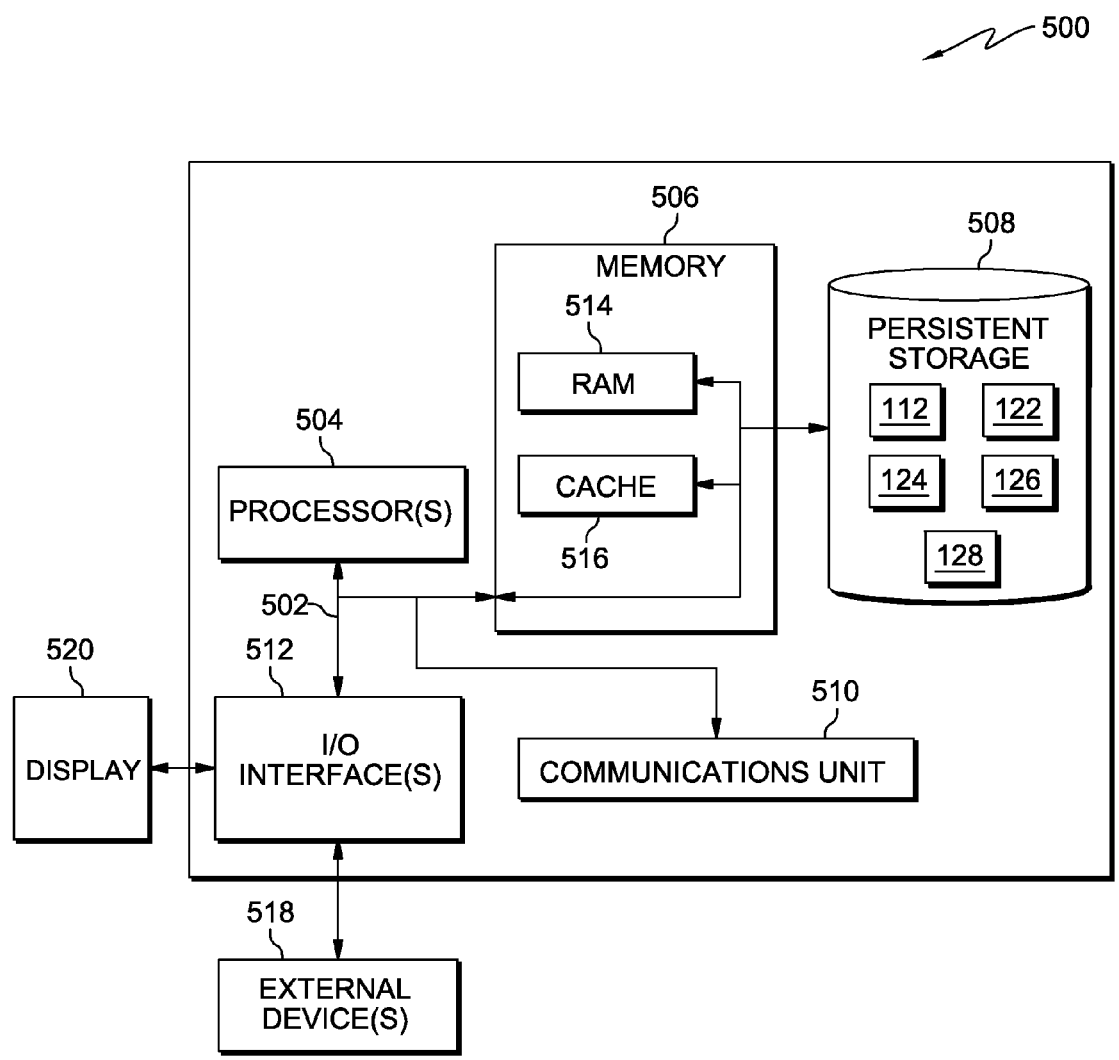
FIG. 5 depicts a block diagram of components of the computing device executing a client program, a search engine program, a search expansion program and an event collector program, in accordance with an exemplary embodiment of the present invention.

FIG. 5 depicts a block diagram, 500, of respective components of client device 110 and server device 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client device 110 and server device 120 respectively include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Client program 112, search engine program 122, search expansion program 124 and event collector program 126 are respectively stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. Client program 112, search engine program 122, search expansion program 124 and event collector program 126 may respectively be downloaded to persistent storage 508 through communications unit 510.

I/O interface(s) 512 allows for input and output of data with other devices that may be connected to computing device client device 110 and server device 120 respectively. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., client program 112, search engine program 122, search expansion program 124, event collector program 126 and event data 128, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term "Smalltalk" and the like may be subject to trademark rights in various jurisdictions throughout the world and are used here only in reference to the products or services properly denominated by the marks to the extent that such trademark rights may exist.

What is claimed is:

1. A method for expanding a search query, comprising:
   receiving, by one or more processors, one or more initial search results from a search engine, wherein the one or more initial search results are based, at least in part, on a search query;
   generating, by one or more processors, a collection of events for the one or more initial search results, wherein events included in the collection of events are within a temporal proximity to at least one of the one or more initial search results;
   determining, by one or more processors, content of the collection of events based, at least in part, on natural language processing of at least one of the one or more initial search results included in the collection of events;
   determining, by one or more processors, a search suggestion based, at least in part, on the content of the collection of events; and
   sending, by one or more processors, the search suggestion to the search engine, wherein the search engine provides the search suggestion and the one or more initial search results to a user.

2. The method of claim 1, further comprising:
   organizing, by one or more processors, a plurality of search suggestions based, at least in part, on a frequency of occurrence of the content of the collection of events.

3. The method of claim 1, further comprising:
   determining, by one or more processors, an information gain for one or more features of the content of the collection of events.

4. The method of claim 3, wherein the search suggestion is determined based, at least in part, on whether the information gain of the one or more features exceeds a predetermined value.

5. The method of claim 4, further comprising:
   organizing, by one or more processors, a plurality of search suggestions based, at least in part, on the determined information gain of the one or more features.

6. The method of claim 1, further comprising:
   determining, by one or more processors, one or more subsets of the content, wherein the one or more subsets of the content include at least two features selected from one or both of one or more features of the collection of events and one or more features of the one or more initial search results.

7. The method of claim 6, wherein the search suggestion is determined based, at least in part, on whether a number of co-occurrences of the at least two features of the one or more subsets exceeds a predetermined value.

* * * * *